(12) United States Patent
Ulbricht

(10) Patent No.: US 8,908,029 B2
(45) Date of Patent: Dec. 9, 2014

(54) CLASSIFICATION OF THE VEHICLE ENVIRONMENT

(75) Inventor: Dirk Ulbricht, Wangen (DE)

(73) Assignee: ADC Automotive Distance Control Systems GmbH (DE)

( * ) Notice: Subject to any disclaimer, the term of this patent is extended or adjusted under 35 U.S.C. 154(b) by 1025 days.

(21) Appl. No.: 12/808,558

(22) PCT Filed: Nov. 29, 2008

(86) PCT No.: PCT/DE2008/001999
§ 371 (c)(1),
(2), (4) Date: Jun. 16, 2010

(87) PCT Pub. No.: WO2009/076929
PCT Pub. Date: Jun. 25, 2009

(65) Prior Publication Data
US 2010/0321496 A1    Dec. 23, 2010

(30) Foreign Application Priority Data
Dec. 18, 2007    (DE) .................. 10 2007 061 658

(51) Int. Cl.
*H04N 7/00*    (2011.01)
*G06K 9/00*    (2006.01)
*B60Q 1/14*    (2006.01)
*B60R 1/00*    (2006.01)

(52) U.S. Cl.
CPC ...... *G06K 9/00791* (2013.01); *B60Q 2300/337* (2013.01); *B60Q 1/1423* (2013.01); *B60Q 2300/314* (2013.01); *B60R 1/00* (2013.01)

USPC ............ 348/118; 348/131; 348/143; 348/148

(58) Field of Classification Search
CPC ........... B60Q 2200/38; B60Q 2300/05; B60Q 2300/314; B60Q 2300/337; G06K 9/00791
USPC ............................ 348/61, 118, 131, 143, 148
See application file for complete search history.

(56) References Cited

U.S. PATENT DOCUMENTS 5,987,174 A * 11/1999 Nakamura et al. ............ 382/199
6,677,986 B1 * 1/2004 Pochmuller ................... 348/149
(Continued)

FOREIGN PATENT DOCUMENTS

DE    10 2006 001 261 A1    7/2006
DE    102005027887    * 12/2006 ............... B60Q 1/02
(Continued)

OTHER PUBLICATIONS

"Circular Letter RST Jan. 2007", Feb. 7, 2007, retrieved from <www.transport.ie/upload/general/9095-1.doc>.*

(Continued)

*Primary Examiner* — David Lazaro
*Assistant Examiner* — Sarah Drabik
(74) *Attorney, Agent, or Firm* — RatnerPrestia

(57) ABSTRACT

A method for a motor vehicle for the predictive classification of a future vehicle environment and its lighting conditions. To this end, a camera system is oriented with respect to a region ahead of the vehicle. A sequence of images is recorded. In a predefined central image detail, the change of brightness per unit of time and/or distance is determined and this is used to infer the environment ahead of the vehicle.

7 Claims, 2 Drawing Sheets

(56) References Cited

U.S. PATENT DOCUMENTS

| | | | |
|---|---|---|---|
| 6,900,594 B1* | 5/2005 | Reichert et al. | 315/83 |
| 7,278,657 B1 | 10/2007 | McCurdy | |
| 7,848,886 B2* | 12/2010 | Kawasaki | 701/301 |
| 7,949,190 B2* | 5/2011 | Wu et al. | 382/206 |
| 2006/0159309 A1* | 7/2006 | Tsukamoto | 382/104 |
| 2006/0222208 A1* | 10/2006 | Leleve et al. | 382/104 |
| 2008/0027607 A1* | 1/2008 | Ertl et al. | 701/36 |
| 2009/0034799 A1* | 2/2009 | Nishida et al. | 382/104 |
| 2009/0192686 A1 | 7/2009 | Niehsen et al. | |

FOREIGN PATENT DOCUMENTS

| | | |
|---|---|---|
| DE | 10 2005 045 017 A1 | 3/2007 |
| DE | 10 2007 003 498 A1 | 7/2008 |
| EP | 0904989 | 3/1999 |
| EP | 1 708 125 A1 | 10/2006 |
| JP | 60-240545 | 11/1985 |
| JP | 5 183 784 | 7/1993 |
| JP | 11 205 665 | 7/1999 |
| JP | 2006-298 362 | 11/2006 |

OTHER PUBLICATIONS

Wikipedia, "Warning sign", Oct. 22, 2006, retrieved from <https://web.archive.org/web/20061022132640/http://en.wikipedia.org/wiki/Warning_sign>.*

International Preliminary Report on Patentability for PCT/DE2009/000754 filed May 27, 2009, mailed Mar. 10, 2011.

Translation of the Official Letter of Provisional Rejection for Japanese Patent Appl. 2010-540 025, dated Jan. 29, 2013.

* cited by examiner

CLASSIFICATION OF THE VEHICLE ENVIRONMENT

This application is the U.S. national phase application of PCT International Application No. PCT/DE2008/001999, filed Nov. 29, 2008, which claims priority to German Patent Application No. 10 2007 061 658.0, filed Dec. 18, 2007, the contents of such applications being incorporated by reference herein.

FIELD OF THE INVENTION

The invention relates to a motor vehicle with a camera system and a method for the predictive classification of a future vehicle environment. Such a method can be used e.g. for tunnel recognition in motor vehicles with automatic lighting control and/or automatic windows control/sunroof control. If a tunnel was recognized the lighting would be switched on and a possibly opened window would be closed. The closing of a window in time can only be implemented with a predictive classification of the vehicle environment. As the indicated method is designed for a predictive camera system, it can be additionally performed without any problems by a conventional camera for lane recognition, traffic sign recognition, and for the recognition of other road users (vehicles, pedestrians), etc.

BACKGROUND OF THE INVENTION

The document DE 10 2006 001 261 A1, which is incorporated by reference, shows a tunnel recognition device and a lighting control device for a vehicle with an image recording unit for recording images in a region located ahead.

SUMMARY OF THE INVENTION

It is an object of the present invention to indicate a method for a vehicle, which makes it possible to reliably recognize in predictive manner a future vehicle environment.

This object is achieved according to aspects of the invention by a method and a motor vehicle with a camera system.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
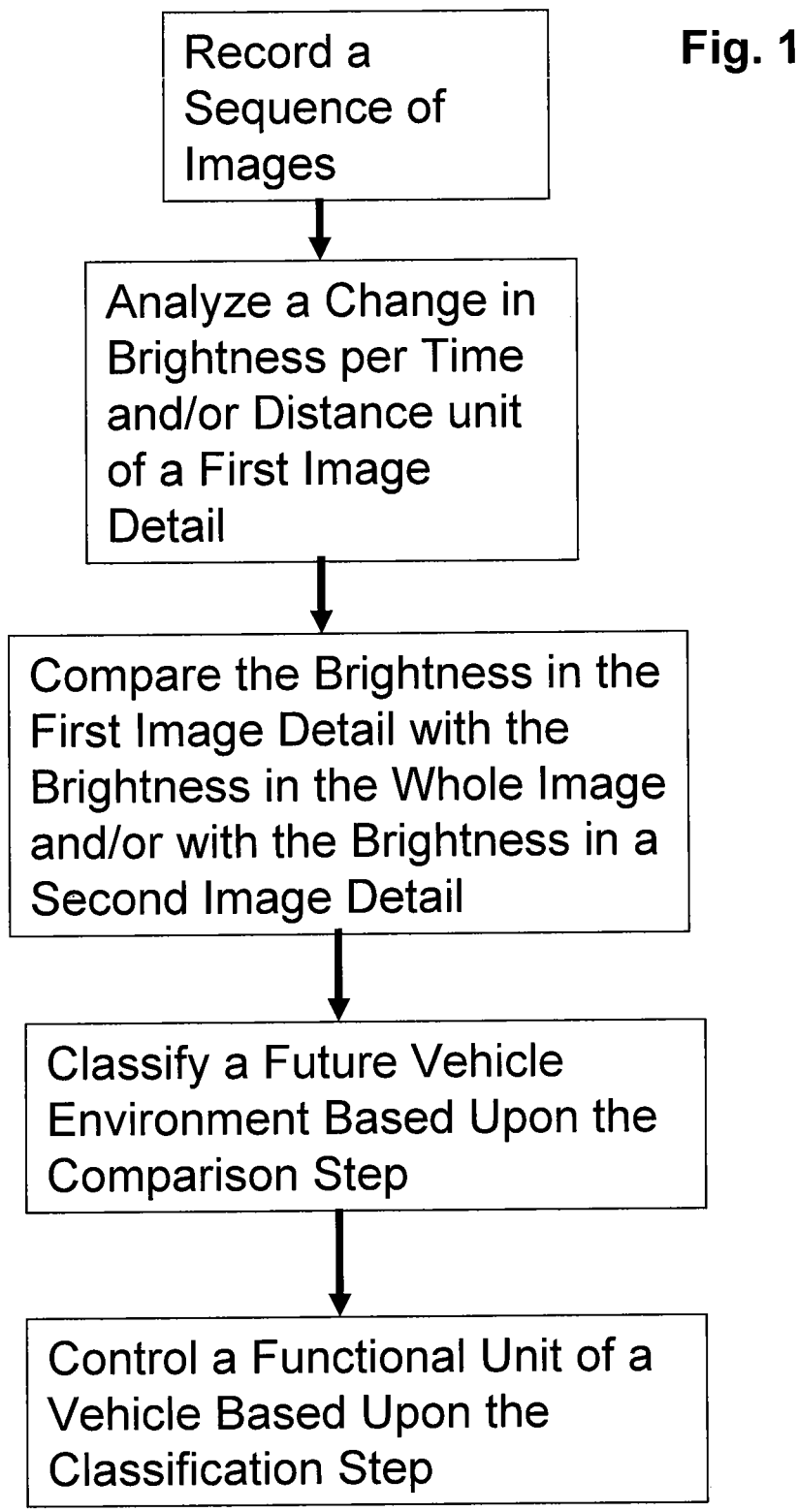
FIG. 1 is schematic block diagram of a method for the productive classification of a future vehicle environment.

Referring now to FIG. 1, a method for a motor vehicle with a camera system for the predictive classification of a future vehicle environment is indicated. The camera system is oriented with respect to a region ahead of the vehicle and records a sequence of images. For the processing of the image data a processor unit and for the storing of the image data a storage unit is provided. In the image a first image detail is predefined. In this image detail the change of brightness per unit of time and/or distance is determined and this is used to infer the environment ahead of the vehicle. The first image detail is arranged in the central image region.

A camera system for a driver assistance function is usually oriented with respect to an environment centrally ahead of the vehicle to optimally detect the lane course. Objects, which are located on the lane at a great distance to the motor vehicle are thus usually shown centered in the image. The size of the object in the image increases with a decreasing distance, so that dark objects, such as e.g. a dark tunnel entry with a decreasing distance, are shown always larger in the first image detail and that the brightness in this image detail decreases with the time. Thus, the change of the brightness is used to infer the environment ahead of the vehicle.

In a special example of embodiment the brightness is compared in the first, central image detail with the brightness in the whole image and/or the brightness in a second image detail. In particular, the quotient of brightness of the first image detail in relation to the brightness of the whole image and/or the quotient of brightness of the first image detail in relation to the brightness of the second image detail is formed and evaluated.

Thus, e.g. the brightness in the image center is compared with the brightness at the upper, right and/or left image edge to recognize the forthcoming entry into a tunnel, a gallery, a multi-story car park, a small patch of forest or an avenue. The brightness at the upper image edge will decrease for the objects mentioned only shortly ahead of the entry. The second image detail can be also the remaining portion of the whole image, if one cuts out the first image detail, i.e. the remaining frame around the first image detail, so that first plus second image detail result in the whole image.

Preferably, the classification comprises at least one of the following vehicle environments: tunnel, gallery, garage and/or multi-story car park, forest area, underpass, avenue.

In a further positive embodiment of the invention the camera system is embodied in such a manner that features such as portals and/or entries and/or operating elements and/or barriers can be recognized from the image data by the data processing. This information is used for classification.

Methods for the recognition of objects are e.g. pattern recognition, utilization of the color information, edge analysis, analysis whether it is a stationary or a moving object e.g. with the aid of the optical flow. Size and distance of objects can be estimated also with a monocular camera with known installation position.

A method is claimed, which serves for the predictive control of at least one functional unit of a vehicle. The control is performed depending on a classification result. Preferably, the functional unit is a lighting control or an automatic window and/or sun roof control or a circulating air control.

Figure 2:
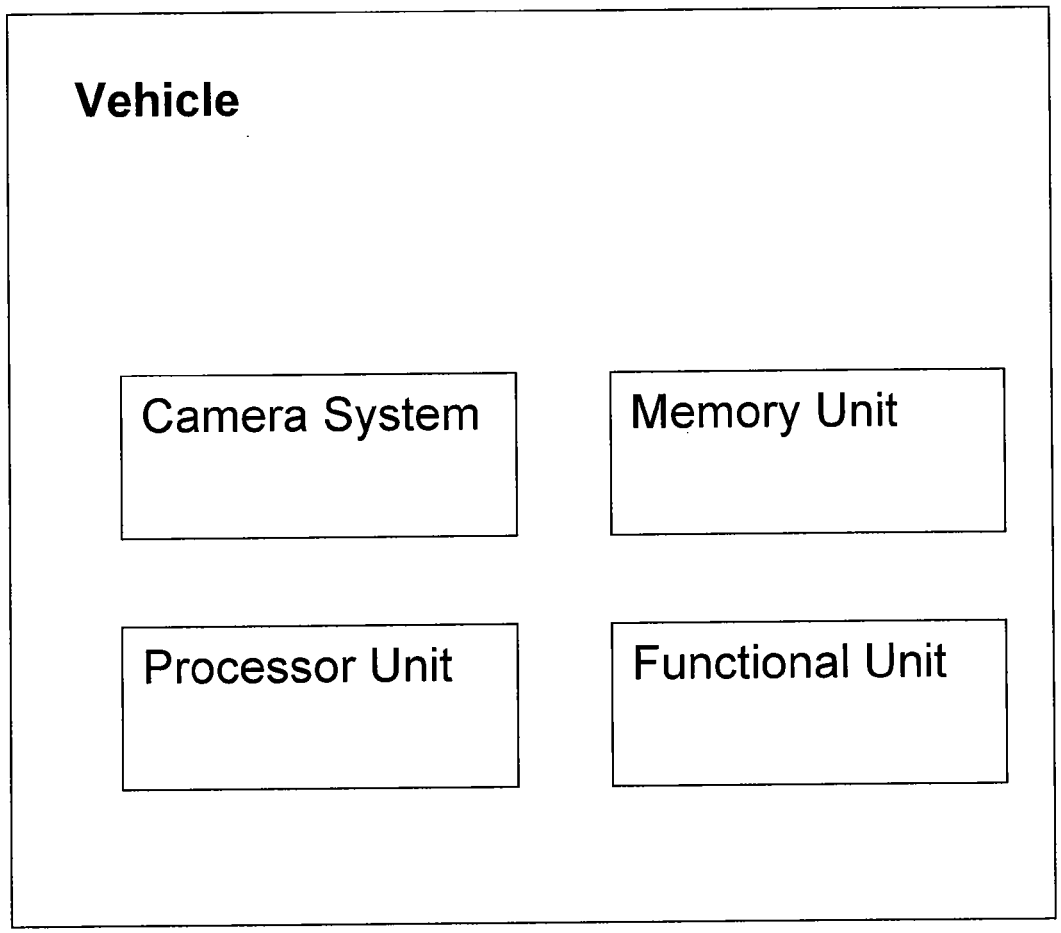
FIG. 2 is a block diagram of a motor vehicle that is configured to carry out the method of FIG. 1.

Referring now to FIG. 2, in a further example of embodiment a method as described above is implemented in a motor vehicle with a camera system and a processor unit. The motor vehicle comprises a functional unit, which can be activated according to the classified, future vehicle environment.

The invention is described in detail in the following on the basis of examples of embodiment.

In certain situations the driver must perform always the same actions. Such situations include entry and exit in and/or out of tunnels, forest areas, galleries, i.e. roofed passages, which e.g. in alpine regions serve as avalanche protection, multi-story car parks and underground parking, avenues, etc. For the recognition and classification of such a standard situation a forward directed camera is integrated into the vehicle. On the basis of the image data a classification is performed, whereby at least one of the following objects is provided as classification object: tunnels, galleries, multi-story car park, underground parking, forest, underpass and avenue. Depending on the classification result the systems integrated in the vehicle can relieve the driver from standard procedures.

In one example of embodiment due to the recognized forthcoming entry into a tunnel, window and sun roof are closed, the air circulation circuit is activated, the headlight is switched on and if necessary the compartment for the sun glasses is opened. In a second example of embodiment the classification result indicates the forthcoming entry into a forest area. In this case the lighting is switched on and if necessary the compartment for the sun glasses is opened.

The classification is performed on the basis of the image data. A tunnel portal appears e.g. during the day as a dark region in the course of the roadway. A tunnel portal is recognized, if the average brightness in the corresponding image detail decreases over the time and/or over the distance, whereas the average brightness in the whole image or in a second image detail preferably remains approximately constant on the top right or top left in the image.

Since tunnels are usually illuminated, they appear at night as a bright region in the image as long as the vehicle moves towards the tunnel. Contrary to localities the side walls of the tunnel are likewise illuminated and appear brightly in the image and are thus identifiable by means of an object recognition.

In a further example of embodiment the recognition of gallery portals is described. Gallery portals can be recognized like tunnel portals via the changing brightness in the further course of the road. With galleries at least one of the side walls in the day is as bright as the environment outside of the gallery.

A further form of embodiment of the invention comprises the classification of entries of multi-story car parks and underground parking. In their appearance they resemble tunnel entries. However, it is characteristic for multi-story car parks and underground parking that the vehicle drives only at low speed and/or at the entry barriers or machines are recognized. At least if one of these conditions applies, the classification multi-story car park and/or underground parking is made. Also the actions, which the driver makes when entering a multi-story car park or an underground parking, resemble those when entering a tunnel with one exception: at the entry of multi-story car parks and underground parking there are often operating elements (machines for parking tickets or other entrance systems), which the driver has to operate from the vehicle-interior. Therefore, the window at the driver's seat may not be closed.

A further example of embodiment deals with entries and exits in and out of forest areas. They are characterized in the day by a rapid drop and/or increase of the average image brightness in a first image detail. Contrary to tunnels, galleries, multi-story car parks and underground parking no portal can be recognized when entering the forest area.

The classification underpass uses the property that an underpass is a short tunnel. Thus, if a tunnel entry as described already above and a tunnel exit is recognized at a short distance (e.g. 20 to 50 m, in particular 30 m) behind the tunnel entry, then the classification understands "underpass". A tunnel exit at a short distance is recognized e.g. as bright spot in particular with a form, which essentially resembles the tunnel entry or a typical tunnel exit.

Avenues are characterized by trees and their shadows. Due to the rapidly changing lighting conditions and tree structures avenues can be recognized.

The recognized categories are provided e.g. via data bus to the corresponding functional units in the vehicle. The systems act according the environment classification. For example, the air conditioning activates the circulating air circuit in "closed environments" such as tunnel, multi-story car park, underground parking, whereas with dark environments or environments with a critical illumination (forest, tunnel, gallery, avenue, multi-story car park, underground parking) the lighting system switches on the headlight.

The invention claimed is:

1. In a motor vehicle including a camera system that is oriented with respect to a region ahead of the motor vehicle to record a sequence of images, a processor unit for data processing of image data, and a memory unit for storage of image data, a method for predictive classification of a future vehicle environment of the motor vehicle comprises:
    recording a sequence of images using the camera system;
    determining a change of brightness per time and/or distance unit in a first image detail that is arranged in a central image region of an image;
    recognizing, independent of a roadway sign, at least one object in another region of the image separate from the central image region; and
    classifying an environment ahead of the vehicle by using the change of brightness to detect that the environment ahead of the vehicle is different than a current environment of the vehicle and by using the at least one recognized object to classify the environment ahead of the vehicle as being one of a plurality of environments known to the processor unit.

2. A method according to claim 1 further comprising the step of comparing the brightness in the first image detail with an overall brightness in the image and/or with the brightness in a second image detail.

3. A method according to claim 1, wherein the classification comprises at least one of the following vehicle environments: a tunnel, a gallery, a garage, a multi-story car park, a forest area, an underpass, and/or an avenue.

4. A method according to claim 3, further comprising the step of recognizing portals, entries, operating elements and/or barriers by data processing of the image data and, wherein recognition of portals, entries, operating elements and/or barriers contribute to the classification.

5. The method of claim 1, further comprising the step of predictive control of at least one functional unit of a vehicle depending on the inferred environment ahead of the motor vehicle.

6. A method according to claim 5, wherein the functional unit is a lighting control, an automatic window, a sun roof control and/or a circulating air control.

7. A motor vehicle comprising:
    a camera system;
    a processor unit configured to:
        record a sequence of images using the camera system;
        determine an environment ahead of the motor vehicle by accounting for a change of brightness per time and/or distance unit in a first image detail that is arranged in a central image region of an image;
        recognize, independent of a roadway sign, at least one object in another region of the image separate from the central image region; and
        classify an environment ahead of the vehicle by using the change of brightness to detect that the environment ahead of the vehicle is different than a current environment of the vehicle and by using the at least one recognized object to classify the environment ahead of the vehicle as being one of a plurality of environments known to the processor unit; and a functional unit, which can be activated according to the inferred environment ahead of the motor vehicle.

\* \* \* \* \*